United States Patent
Ao et al.

(10) Patent No.: US 9,515,890 B2
(45) Date of Patent: Dec. 6, 2016

(54) METHOD, SYSTEM AND CONTROLLING BRIDGE FOR OBTAINING PORT EXTENSION TOPOLOGY INFORMATION

(75) Inventors: Ting Ao, Shenzhen (CN); Yuehua Wei, Shenzhen (CN); Jinghai Yu, Shenzhen (CN); Lin Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 230 days.

(21) Appl. No.: 14/115,724

(22) PCT Filed: Apr. 20, 2012

(86) PCT No.: PCT/CN2012/074460
§ 371 (c)(1),
(2), (4) Date: Nov. 5, 2013

(87) PCT Pub. No.: WO2012/152178
PCT Pub. Date: Nov. 15, 2012

(65) Prior Publication Data
US 2014/0086098 A1   Mar. 27, 2014

(30) Foreign Application Priority Data
May 6, 2011 (CN) .......................... 2011 1 0117096

(51) Int. Cl.
*H04W 56/00* (2009.01)
*H04L 12/24* (2006.01)
(Continued)

(52) U.S. Cl.
CPC ........... *H04L 41/12* (2013.01); *H04L 12/4625* (2013.01); *H04L 45/16* (2013.01);
(Continued)

(58) Field of Classification Search
CPC . H04L 12/46; H04L 12/4625; H04L 45/302; H04L 45/745; H04L 61/6022; H04L 41/12; H04L 45/16; H04L 49/201; Y02B 60/43
USPC ........................................................ 370/254
See application file for complete search history.

(56) References Cited

U.S. PATENT DOCUMENTS

2007/0041328 A1* 2/2007 Bell .............................. 370/248
2009/0313386 A1* 12/2009 Hamamoto et al. .......... 709/245
(Continued)

FOREIGN PATENT DOCUMENTS

CN            101145927 A          3/2008

OTHER PUBLICATIONS

Cisco et al. "P802.1Qbh Draft 0.0 Introduction", published on Jan. 2010.*
(Continued)

*Primary Examiner* — Ian N Moore
*Assistant Examiner* — Mewale Ambaye
(74) *Attorney, Agent, or Firm* — Ling Wu; Stephen Yang; Ling and Yang Intellectual Property

(57) ABSTRACT

A method, system and controlling bridge (CB) for acquiring port extension (PE) topology information, and a method and system for processing an upstream port, wherein, the method for acquiring the port extension (PE) topology information includes: a CB receiving a link layer discovery protocol (LLDP) message sent by the PE, and perceiving an attachment of the PE; the CB receiving Extended Port Create message sent by the PE, and instantiating corresponding instantiated ports inside the CB. By adopting the above-mentioned technical scheme, the topology information of the PE connected to the CB can be obtained and a channel for forwarding data can be established, effectively.

14 Claims, 3 Drawing Sheets

(51) Int. Cl.
H04L 12/741 (2013.01)
H04L 29/12 (2006.01)
H04L 12/931 (2013.01)
H04L 12/725 (2013.01)
H04L 12/761 (2013.01)
H04L 12/46 (2006.01)

(52) U.S. Cl.
CPC ......... *H04L 45/302* (2013.01); *H04L 45/745* (2013.01); *H04L 49/201* (2013.01); *H04L 61/6022* (2013.01); *Y02B 60/43* (2013.01)

(56) References Cited

U.S. PATENT DOCUMENTS

2014/0044129 A1* 2/2014 Mentze ................ H04L 49/354
370/390
2014/0269710 A1* 9/2014 Sundaram ............ H04L 45/302
370/392

OTHER PUBLICATIONS

Virtual Bridged Local Area Networks-Port Extenders, IEEE P802.1 BR/D2.0, Apr. 1, 2011, pp. 106.*
IEEE et al (hereinafter referred as IEEE Explorer), Virtual Bridged Local Area Networks—Amendment: Bridge Port extens on Dec. 23, 2010, pp. 1-176, XP01763862.*
International Search Report for PCT/CN2012/074460 dated Jul. 19, 2012.
Pelissier, L., "P802.1 Qbh Draft 0.0 Introduction", IEEE 802.1 Qdh-Bridge Port Extension, Jan. 21, 2010, [retrieved on Jul. 19, 2012] Retrieved from the Internet: URL: http://www.ieee802.org/1/pages/802.1bh.html, the whole document.
Virtual Bridged Local Area Networks—Port Extenders, IEEE P802.1 BR/D2.0, Apr. 1, 2011, IEEE Computer Society, XP017638647.
Station and Media Access Control Connectivity Discovery, IEEE Standard for Local and metropolitan area networks-; New York, NY 10016-5997, USA, Sep. 2009. XP017694344.

* cited by examiner

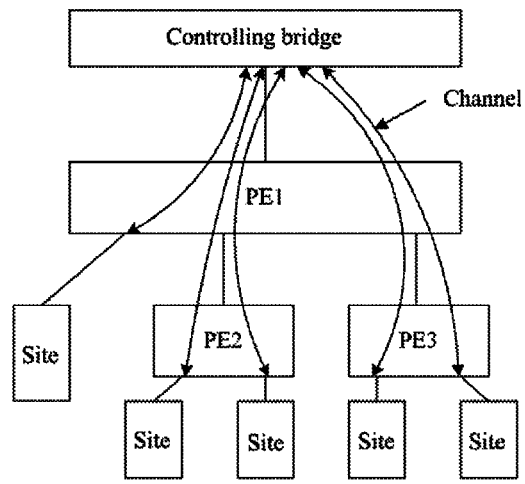
FIG. 1 Priro Art
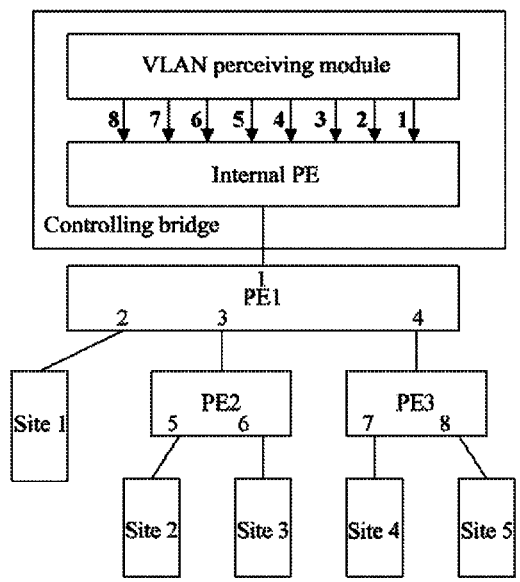
FIG. 2

METHOD, SYSTEM AND CONTROLLING BRIDGE FOR OBTAINING PORT EXTENSION TOPOLOGY INFORMATION

TECHNICAL FIELD

The present document relates to the data communication technology, and in particular, to a method, system and controlling bridge for acquiring port extension topology information and a method and system for processing an upstream port.

BACKGROUND OF THE RELATED ART

A unified data center structure is a network structure that combines the traditional local area network (LAN) and the storage area network (SAN) in the same physical network so as to reduce the structure complexity and strengthen the data flow and visit. In order to bring it into effect, the traditional Ethernet must be upgraded as "no-losing", and provide extra characteristic and function of the data center network. Therefore, the storage protocol must be adjusted so as to run on the Ethernet.

The institute of electrical and electronics engineers (IEEE) has already defined the term, data center bridging (DCB), which is an framework set expanded from the Ethernet and designed to improve the Ethernet and data center management. The DCB is also called as Converged Enhanced Ethernet (CEE), Data Center Ethernet (DCE) (the brand owned by Cisco), Enhanced Ethernet for Data Center (EEDC), and the like.

At present, in the DCB group, a requirement on an edge virtual bridging (EVB) of a virtual environmental network is proposed, that is, for a physical terminal site, it includes a plurality of virtual terminal sites, and each virtual terminal site requires to have the services of accessing the neighbor bridges of the LAN. In the EVB environment, a network adapter (network interface card, NIC) has a plurality of virtual network adapters (vNICs), and each vNIC can communicate with the bridge in the EVB independently, and those a plurality of vNICs share a link. In order to realize that function, the DCB group has proposed a port extension mode. That is, the ports of an interchanger connecting to a plurality of sites can be realized through the Port Extension (PE); if that PE is embedded into the server, then the ports of an interchanger connecting to a plurality of virtual terminal sites (Virtual Machine, VM) can be realized and the communication among them is realized through the interchanger, and the interchanger here is called the controlling bridge (CB).

In order to realize this kind of port extension, the services transmitted on the virtual sites need to be isolated, and the method adopted at present is to introduce a new tag (E-tag), to establish a plurality of channels (E-Channel) between the controlling bridge and the site, thus realizing the isolation of the services, as shown in FIG. 1. Each message coming out from the controlling bridge will be carried with one E-tag by the controlling bridge, and the PE will send that message to the correct egress port according to the E-tag value of that message. Therefore, the controlling bridge is required to be able to configure the port of the PE with the E-tag member set and the untagged set, to realize normally forwarding the message carrying the E-tag by the PE. The corresponding message commands are already provided in the standard at present, the downlink port of the PE sends the Extended Port Create message to ask for assigning the E-tag, the controlling bridge replies to that port with one E-tag, and the PE adds that port into the member set and the untagged set corresponding to that E-tag after receiving it. If there is a cascade PE, such as PE1 in FIG. 1, between that PE, such as PE2, and the controlling bridge, then the controlling bridge further needs to send E-channel register message to the port of the PE1 connected to the PE2, and the PE1 adds that port into the member set of that E-tag after receiving the message.

Therefore, for the controlling bridge, it should first clearly understand the situation of the PE connected to the controlling bridge itself, each port of the PE, and the connection relations among the ports, that is, the topology. There is no method for specifically acquiring the topology of each connected PE at present.

SUMMARY OF THE INVENTION

The present document provide a method, system and controlling bridge (CB) for acquiring port extension (PE) topology information and a method and system for processing an upstream port, to solve the problem that there is no definitive way for obtaining the topology information of each PE connected to the CB at present.

In order to solve the above-mentioned problem, the present document adopts the following technical scheme:

a method for acquiring port extension (PE) topology information comprises:

a controlling bridge (CB) receiving a link layer discovery protocol (LLDP) message sent by the PE and perceiving an attachment of the PE; and the CB receiving Extended Port Create message sent by the PE and instantiating a corresponding instantiated port inside the CB.

Optionally, the step of the CB receiving Extended Port Create message sent by the PE and instantiating a corresponding instantiated ports inside the CB comprises:

the CB receiving the Extended Port Create message sent by the PE, acquiring extended ports of the PE, instantiating instantiated ports corresponding to the extended ports one by one inside the CB, and establishing channels between the instantiated ports and the extended ports corresponding to the instantiated ports.

Optionally, the method further comprises:

the CB sending the LLDP message to the PE; and then the PE determining a port as an upstream port according to the received LLDP message sent by the CB.

Optionally, the method further comprises:

after instantiating the corresponding instantiated ports inside the CB, the CB sending the LLDP message to the PE through the instantiated ports; and then the PE determining an upstream port according to the received LLDP message sent by the CB.

Optionally, the method further comprises:

after the PE determines the upstream port, sending the LLDP message and/or the Extended Port Create message to the CB through the upstream port.

Optionally, the method further comprises:

after the PE determines the upstream port, sending the LLDP message and/or the Extended Port Create message to the CB through the upstream port.

Optionally, the method further comprises:

if the LLDP message received by the CB and sent by the PE is the LLDP message sent by the PE and received by one port of the CB for the first time, then creating an internal PE inside the CB, and instantiating an instantiated port on the PE inside the CB.

Optionally, the method further comprises:

after the PE determines the upstream port, the PE changing the upstream port determined previously, reconfiguring tag information on the upstream port determined previously onto the changed upstream port, and/or, sending the LLDP message and the extended port message through the changed upstream port.

Optionally, the step of the PE changing the upstream port determined previously comprises:

the PE changing the upstream port determined previously according to port priority information carried in the received LLDP message sent by the CB; or changing the upstream port determined previously because the upstream port determined previously breaks down and is unable to work.

A method for processing an upstream port comprises:

a port extension (PE) changing an upstream port determined previously; and reconfiguring tag information on the upstream port determined previously onto the changed upstream port, and/or, sending a link layer discovery protocol (LLDP) message and extended port message through the changed upstream port.

Optionally, the step of the PE changing the upstream port determined previously comprises:

the PE changing the upstream port determined previously according to port priority information carried in the received LLDP message sent by a controlling bridge (CB); or changing the upstream port determined previously because the upstream port determined previously breaks down and is unable to work.

A controlling bridge (CB) for acquiring port extension (PE) topology information comprises a perceiving module and an establishing device, wherein, the perceiving module is configured to perceive that the CB is connected to the PE after the CB receives a link layer discovery protocol (LLDP) message sent by the PE; and the establishing device is configured to instantiate corresponding instantiated ports inside the CB after the CB receives Extended Port Create message sent by the PE.

Optionally, the establishing device is configured to instantiate corresponding instantiated ports inside the CB after the CB receives the Extended Port Create message sent by the PE by means of: after the CB receives the Extended Port Create message sent by the PE, acquiring extended ports of the PE, instantiating instantiated ports corresponding to the extended ports one by one inside the CB, and establishing channels from the instantiated ports to the extended ports corresponding to the instantiated ports.

Optionally, the CB further comprises a sending device, wherein, the sending device is configured to: send the LLDP message to the PE; or send the LLDP message to the PE through the instantiated ports after instantiating the corresponding instantiated ports inside the CB.

Optionally, the perceiving module is further configured to:

if the LLDP message received by the CB and sent by the PE is the LLDP message sent by the PE and received by one port of the CB for the first time, then create an internal PE inside the CB, and instantiate an instantiated port on the PE inside the CB.

A system for acquiring port extension (PE) topology information comprises any one of the above-mentioned CBs and PEs, wherein, the PE comprises a determination device and a sending device, wherein, the determination device is configured to determine an upstream port according to a received link layer discovery protocol (LLDP) message sent by the CB; and the sending device is configured to send the LLDP message and Extended Port Create message to the CB according to the upstream port determined by the determination device.

Optionally, the PE further comprises a processing device, wherein:

the processing device is configured to change an upstream port determined previously, and reconfigure tag information on the upstream port determined previously onto the changed upstream port; and the sending device is configured to send the LLDP message and the extended port message through the changed upstream port.

Optionally, the processing device is configured to change an upstream port determined previously by means of: changing the upstream port determined previously according to port priority information carried in the received LLDP message sent by the CB; or changing the upstream port determined previously because the upstream port determined previously breaks down and is unable to work.

A system for processing an upstream port, comprises a changing device and a processing device, wherein:

the changing device is configured to change an upstream port determined previously; and the processing device is configured to reconfigure tag information on the upstream port determined previously onto the changed upstream port, and/or, send a link layer discovery protocol (LLDP) message and extended port message through the changed upstream port.

Optionally, the changing device is configured to change an upstream port determined previously by means of: changing the upstream port determined previously according to port priority information carried in the received LLDP message sent by a controlling bridge (CB); or changing the upstream port determined previously because the upstream port determined previously breaks down and is unable to work.

By adopting the above-mentioned technical scheme, the topology information of the PE connected to the CB can be obtained and the channel used for transmitting the data can be established, effectively.

BRIEF DESCRIPTION OF DRAWINGS

FIG. 1 is a diagram of a framework of an extended bridge device and each E-channel;

FIG. 2 is a diagram of a topology structure of a CB and a PE according to an embodiment of the present document;

PREFERRED EMBODIMENTS OF THE INVENTION

Figure 3:
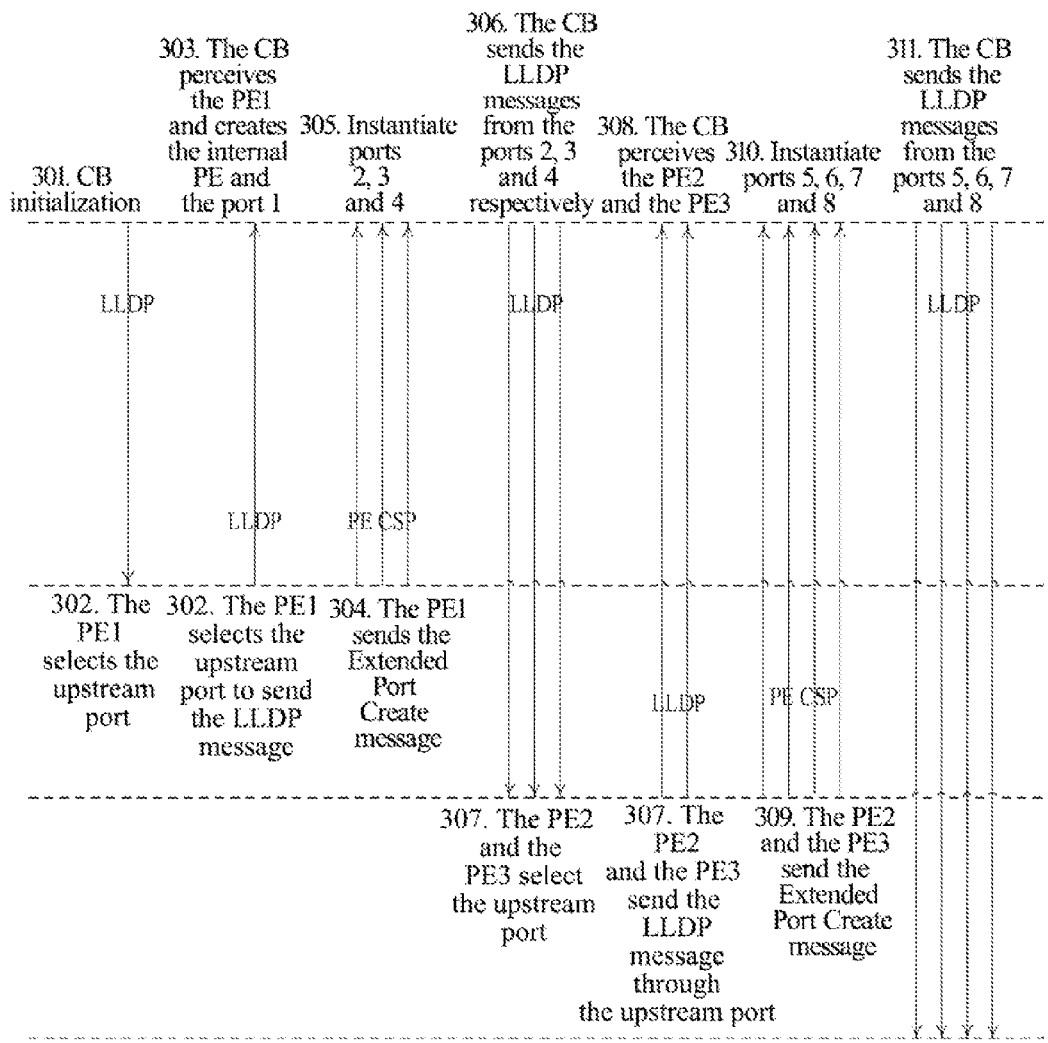
FIG. 3 is a diagram of completing a PE topology discovery in FIG. 2 and establishing E-channel according to an embodiment of the present document.

In order to make the objective, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other. All these combinations are in the protection scope of the present document.

The embodiment of the present document provides a method for acquiring port extension (PE) topology information, including the following steps:

in step S01, a controlling bridge (CB) receives a link layer discovery protocol (LLDP) message sent by the PE and perceives an attachment of the PE;

if the LLDP message received by the CB and sent by the PE is the LLDP message sent by the PE and received by one port of the CB for the first time, then an internal PE inside the CB is created, and an instantiated port is instantiated on the PE inside the CB;

in step S02, the CB receives Extended Port Create message sent by the PE and instantiates corresponding instantiated ports inside the CB.

The CB receives the Extended Port Create message sent by the PE, then acquires extended ports of the PE, instantiates instantiated ports corresponding to the extended ports one by one inside the CB, and establishes channels from the instantiated ports to the extended ports corresponding to the instantiated ports.

The method further can include: the CB sending the LLDP message to the PE; for example, the CB can send the LLDP message to the PE before receiving the LLDP message sent by the PE; or send the LLDP message to the PE when the CB receives the LLDP message sent by the PE.

After instantiating the ports, the method further includes: the CB sending the LLDP message through the instantiated ports.

After the CB sends the LLDP message, the method further includes: the PE determining an upstream port according to the received LLDP message sent by the CB.

After the PE determines the upstream port, the method further includes: sending the LLDP message and/or the Extended Port Create message to the CB through the upstream port.

In addition, after the PE determines the upstream port, the method further includes: the PE changing the upstream port determined previously, reconfiguring tag information on the upstream port determined previously onto the changed upstream port, and/or, sending the LLDP message and the extended port message through the changed upstream port. The way of the PE changing the upstream port determined previously includes: the PE changing the upstream port determined previously according to port priority information carried in the received LLDP message sent by the CB; or changing the upstream port determined previously because the upstream port determined previously breaks down and is unable to work.

After the PE changes its upstream port, the E-channel established through the previous upstream port will be deleted.

The change of the upstream port described here is usually made by the CB notifying the PE to make this change, therefore one management object of the port priority (Cascade Port Priority) is set for each instantiated port and cascade-connected port connected with the PE in the CB, to realize the change of the upstream ports of the PE through the changes of the port priority.

It needs to be illustrated that the format of the LLDP message sent to the PE by the CB is the same with the format of the LLDP message sent to the CB by the PE, but the contents thereof are different.

Embodiment One in the present embodiment, the procedure of acquiring the PE topology information is introduced specifically.

As shown in FIG. 2, it is the topology structure diagram of a CB and a PE of the embodiment of the present document; the connection relation between the CB and the PE is that: the PE1 is directly connected to the CB, the PE2 and the PE3 are all cascade-connected through the PE1 and then connected to the CB. The procedures of the CB acquiring the whole topology information of the PE and the CB establishing the E-channel are illustrated specifically through FIG. 3 hereinafter, and the procedures include the following steps:

in step 301, the CB sends a LLDP message through a port connected to the PE1;

in step 302, the PE1 receives the LLDP message, and sets the port which receives that message as the upstream port, obtains the address of the CB, and sends the LLDP message from the upstream port to the CB;

in step 303, the CB obtains the address of the PE1after receiving the LLDP message sent by the PE1, and at the same time, instantiates an internal PE inside because it perceives that it is connected to one PE, and the VLAN perceiving module is connected to the internal PE through the port 1; and one E-tag is assigned to the port 1;

in step 304, at the same time, each extended port of the PE1 will also send the Extended Port Create message to the CB through its upstream port; there are 3 extended ports 2, 3, 4 here in the PE1, so there are 3 pieces of Extended Port Create message sent to the CB, and each piece of Extended Port Create message represents that one extended port requests to establish the E-channel from the controlling bridge to that port;

in step 305, the CB will instantiate the ports between the interior and the VLAN perceiving module after receiving the Extended Port Create message; here the CB receives 3 pieces of Extended Port Create message of different extended ports here, then it instantiates the ports 2, 3 and 4 for these three ports 2, 3 and 4 of the PE1, and assigns three different E-tags for these 3 extended ports of the PE1, and replies to the PE1 with these E-tags. The PE1 adds the extended ports corresponding to the E-tags respectively into the member set and the untagged set of the corresponding E-tags according to the assigned E-tags, and adds all upstream ports of the PE1 into the member set of the 3 E-tags at the same time. So far, the controlling bridge acquires that it is connected to one PE1, and that PE1 has 3 extended ports, and the 3 E-channels from the internal instantiated ports 2, 3 and 4 of the controlling bridge to the three extended ports of the PE1 are all established;

in step 306, the CB will also send the LLDP messages through the ports 2, 3 and 4 after instantiating the ports 2, 3 and 4 internally; because the E-channels are from the ports 2, 3 and 4 to the extended ports of the PE1, the LLDP messages sent by these ports will not end in the PE1, but be transmitted to the extended ports of the PE1 through the E-channels corresponding to the ports 2, 3 and 4, and reach the PE2, the PE3 and the site 1 connected to these extended ports;

in step 307, the PE2 and the PE3 select the port receiving the message as the upstream port after receiving the LLDP message from the CB, and obtain the address of the CB; and also send the LLDP message to the CB through the upstream port at the same time;

in step 308, the CB obtains the addresses of the PE2 and the PE3 after receiving the LLDP messages from the PE2 and the PE3, and perceives that it is connected to two PEs, the PE2 and the PE3, through the PE1 at the same time;

in step 309, at the same time, each extended port of the PE2 and the PE3 will send the Extended Port Create message to the CB through its upstream port; there are 2 extended ports in the PE2 and the PE3 respectively here: the PE2 has the extended ports 5 and 6, and the PE3 has the extended ports 7 and 8, so there are 4 pieces of Extended Port Create message sent to the CB, and each piece of Extended Port Create message represents that one extended port requests to establish the E-channel from the controlling bridge to that port;

in step 310, the CB will instantiate the ports between the interior and the VLAN perceiving module after receiving the Extended Port Create message; here the CB receives 4 pieces of Extended Port Create message of different extended ports here, then it instantiates the ports 5, 6, 7 and 8 corresponding respectively to the ports 5 and 6 of the PE2 and the ports 7 and 8 of the PE3, and assigns four different E-tags for these 4 extended ports of the PE1, and replies to the PE2 and the PE3 with these E-tags. The PE2 and the PE3 add the extended ports corresponding to the E-tags respectively into the member set and the untagged set of the corresponding E-tags according to the assigned E-tags, and add all their respective upstream ports into the member set of the E-tags belonging to the respective PEs at the same time. So far, the controlling bridge acquires that it is connected to one PE2 and one PE3, wherein the PE2 has 2 extended ports and the PE3 also has 2 extended ports, and the PE2 and the PE3 are all connected to the CB through the PE1. And the 2 E-channels from the internal instantiated ports 5 and 6 of the controlling bridge to the 2 extended ports of the PE2 are all established; and the 2 E-channels from the internal instantiated ports 7 and 8 of the controlling bridge to the 2 extended ports of the PE3 are all established;

in step 311, the CB will also send the LLDP messages through the ports 5, 6, 7 and 8 after instantiating the ports 5, 6, 7 and 8 internally; because the E-channels are from the ports 5 and 6 to the extended ports of the PE2, and from the ports 7 and 8 to the extended ports of the PE3, the LLDP messages sent by these ports will not end in the PE1 and also will not end in the PE2 and the PE3, but be transmitted to the extended ports of the PE2 and the PE3 through the E-channels corresponding to the ports 5, 6, 7 and 8, and reach the site 2, the site 3, the site 4 and the site 5 connected to these extended ports.

So far, the CB finishes the discovery of the whole PE device and obtains the PE topology, and establishes its E-channel used for the data transmission.

Embodiment Two

Figure 4:
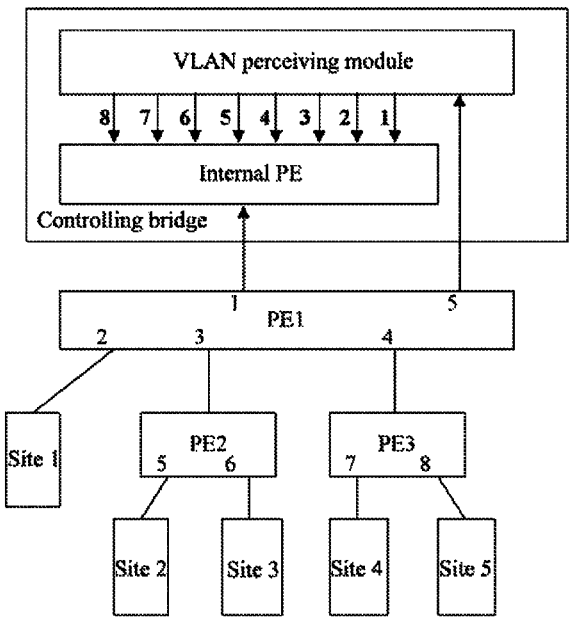
FIG. 4 is a diagram of a topology structure before an upstream port of a PE changes according to an embodiment of the present document.

As shown in FIG. 4, it is a diagram of a topology structure before an upstream port of a PE changes according to an embodiment of the present document; the PE1 and the controlling bridge CB have two connected ports: the port 1 and the port 5. Therefore, the CB will send the LLDP message to the PE1 through those two ports, and the message carries the cascade port priorities assigned for those two ports. After the port 1 and the port 5 of the PE1 receive the LLDP message respectively, through comparing their own cascade port priorities, one port therein is selected to be an upstream port of the PE1. In the present embodiment, the PE1 selects the port 1 as the upstream port of the PE1 (the cascade port priority of the port 1 is higher than the cascade port priority of the port 5), so the PE1 sends the LLDP message to the CB through the port 1; therefore the CB perceives the PE1, thus the E-channels from the CB to other extended ports 2, 3 and 4 of the PE1 are established; the steps are similar with those in embodiment one, and will not go into details here.

Figure 5:
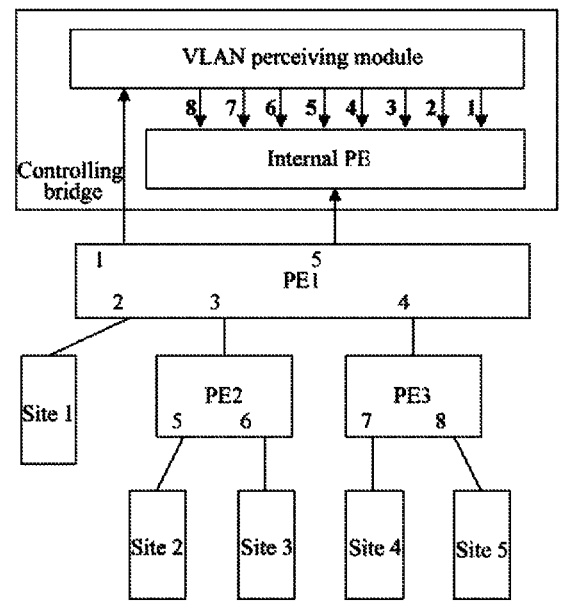
FIG. 5 is a diagram of a topology structure after an upstream port of a PE changes according to an embodiment of the present document.

When the priorities of the cascade-connected ports or the instantiated ports are changed through the configuration or other ways, for example, in the present embodiment, the cascade port priority of the connection between the CB and the port 1 and the port 5 of the PE1 is changed, and the priority reaches the PE1 through the LLDP message sent by the CB, and the PE1 reselects the port 5 as its upstream port again by comparing the priorities (the cascade port priority of the port 5 is higher than the cascade port priority of the port 1 at this moment). If, because of other reasons, for example, the port 1 breaks down, the port 1 of the PE1 cannot receive the LLDP from the CB at this moment, then it can only select its port 5 as the upstream port. As shown in FIG. 5, at this moment, the PE1 will reconfigure the original configuration of the E-CID on the port 1 onto the new upstream port 5. For example, the original upstream port 1 is a member of the E-CID={2, 3, 4, 5, 6, 7, 8}, and because its upstream port changes, these setting will be moved to the new upstream port 5 again, the port 5 is a member of the E-CID={2, 3, 4, 5, 6, 7, 8} at this moment. And the PE1 further need to initiate the Extended Port Create message again for its extended ports, and steps 304 and 305 of the embodiment one will be executed.

The embodiment of the present document further provides a controlling bridge (CB) for acquiring port extension (PE) topology information, and the CB includes a perceiving module and an establishing device, wherein, the perceiving module is configured to perceive that the CB is connected to the PE after the CB receives a link layer discovery protocol (LLDP) message sent by the PE; and the establishing device is configured to instantiate corresponding instantiated ports inside the CB after the CB receives Extended Port Create message sent by the PE.

The establishing device is configured to instantiate corresponding instantiated ports inside the CB after the CB receives the Extended Port Create message sent by the PE by means of: acquiring extended ports of the PE, instantiating instantiated ports corresponding to the extended ports one by one inside the CB, and establishing channels from the instantiated ports to the extended ports corresponding to the instantiated ports.

In addition, the CB further includes a sending device, and the sending device is configured to: send the LLDP message to the PE; or send the LLDP message to the PE through the instantiated ports after instantiating the corresponding instantiated ports inside the CB.

The perceiving module is configured to perceive that the CB is connected to the PE by means of: if the CB receives the LLDP message sent by the PE for the first time, then perceiving that the PE is connected to the CB directly according to the message received for the first time; if it is not the first time for the CB to receive the LLDP message sent by the PE, then perceiving that the PE is connected to the CB through other PEs according to the message which is not received for the first time.

In addition, the perceiving module is further configured to: if the LLDP message received by the CB and sent by the PE is the LLDP message sent by the PE and received by one port of the CB for the first time, then create an internal PE inside the CB, and instantiate an instantiated port on the PE inside the CB.

The above-mentioned CB can be located in a device such as an interchanger, etc. The procedure of the above-mentioned CB obtaining the topology information of the PE and establishing the channel can be referred to FIG. 3, and will not go into details here.

The embodiment of the present document further provides a system for acquiring port extension (PE) topology information, and the system includes the above-mentioned CB and PE, wherein, the PE includes a determination device and a sending device, wherein, the determination device is configured to determine an upstream port according to a received link layer discovery protocol (LLDP) message sent by the CB; and the sending device is configured to send an LLDP message and Extended Port Create message to the CB according to the upstream port determined by the determination device.

Wherein, the PE further can include a processing device, wherein, the processing device is configured to change the upstream port determined previously, and reconfigure tag information on the upstream port determined previously onto the changed upstream port; and the sending device is further configured to send the LLDP message and the extended port message through the changed upstream port.

The processing device is configured to change the upstream port determined previously and reconfigure the tag information on the upstream port determined previously onto the changed upstream port by means of: changing the upstream port determined previously according to port priority information carried in the received LLDP message sent by the CB; or changing the upstream port determined previously because the upstream port determined previously breaks down and is unable to work.

The method, system and controlling bridge for acquiring the PE topology information can obtain the topology information of the PE connected to the CB and establish the channel used for transmitting the data effectively.

The embodiment of the present document further provides a method for processing an upstream port, including:

a port extension (PE) changing an upstream port determined previously; and reconfiguring tag information on the upstream port determined previously onto the changed upstream port, and/or, sending a link layer discovery protocol (LLDP) message and extended port message through the changed upstream port.

The step of the PE changing the upstream port determined previously includes:

the PE changing the upstream port determined previously according to port priority information carried in the received LLDP message sent by a controlling bridge (CB); or changing the upstream port determined previously because the upstream port determined previously breaks down and is unable to work.

The embodiment of the present document further provides a system for processing an upstream port, including a changing device and a processing device, wherein:

the changing device is configured to change an upstream port determined previously; and the processing device is configured to reconfigure tag information on the upstream port determined previously onto the changed upstream port, and/or, send a link layer discovery protocol (LLDP) message and extended port message through the changed upstream port.

The changing device is configured to change the upstream port determined previously by means of: changing the upstream port determined previously according to port priority information carried in the received LLDP message sent by a controlling bridge (CB); or changing the upstream port determined previously because the upstream port determined previously breaks down and is unable to work.

The system can be located in the PE.

By adopting the above-mentioned method and system for processing an upstream port, the upstream port can be changed, and also the LLDP message and/or the Extended Port Create message can be sent through the changed upstream port, thus the CB is enabled to obtain the topology information of the PE connected to the CB and establish the channel used for transmitting the data through the interaction with the PE.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate the technical scheme of the present document while not to limit, and the present document is described in details only referring to the preferable embodiments. Those skilled in the art should understand that they can make the modifications and equivalents according to the technical scheme of the present document without departing from the spirit and scope of the present document, which should be embodied in the scope of the appended claims of the present document.

INDUSTRIAL APPLICABILITY

By adopting the above-mentioned technical scheme, the topology information of the PE connected to the CB can be obtained and the channel used for transmitting the data can be established, effectively. Therefore, the present document has very strong industrial applicability.

What we claim is:

1. A method for acquiring port extension (PE) topology information by a controlling bridge (CB), comprising:

receiving, by the CB, a link layer discovery protocol (LLDP) message sent by the PE and perceiving an attachment of the PE; and receiving, by the CB, Extended Port Create message sent by the PE;

acquiring, by the CB, extended port of the PE;

instantiating, by the CB, instantiated ports corresponding to the extended ports one by one inside the CB; and establishing, by the CB, a channel between the instantiated port and the extended port corresponding to the instantiated port;

sending, by the CB, LLDP messages through ports to the PE, wherein the LLDP messages sent by the CB through the ports to the PE carry cascade port priorities assigned by the CB to the ports respectively;

and then the PE determining a port in the ports as an upstream port according to the received LLDP messages sent by the CB;

reconfiguring, by the PE, tag information on a previous upstream port onto the determined upstream port, and sending an LLDP message and extended port message through the determined upstream port.

2. The method according to claim 1, further comprising:
after instantiating the corresponding instantiated ports inside the CB, the CB sending an LLDP message to the PE through the instantiated ports; and then the PE determining an upstream port according to the received LLDP message sent by the CB.

3. The method according to claim 1, further comprising:
after the PE determines the upstream port, sending the LLDP message; or sending the Extended Port Create message to the CB through the upstream port; or sending the LLDP message and the Extended Port Create message to the CB through the upstream port.

4. The method according to claim 2, further comprising:
after the PE determines the upstream port, sending the LLDP message; or sending the Extended Port Create message to the CB through the upstream port; or sending the LLDP message and the Extended Port Create message to the CB through the upstream port.

5. The method according to claim 1, further comprising:
if the LLDP message received by the CB and sent by the PE is the LLDP message sent by the PE and received by one port of the CB for a first time, then creating an internal PE inside the CB, and instantiating an instantiated port on the PE inside the CB, or
the CB receiving the LLDP message sent by the PE, creating an internal PE inside the CB; or instantiating ports on the CB and the internal PE to connect the CB and the PE; or creating an internal PE inside the CB, and instantiating ports on the CB and the internal PE to connect the CB and the PE.

6. The method according to claim 1, further comprising:
after the PE determines the upstream port, the PE changing the upstream port determined previously, reconfiguring tag information on the upstream port determined previously onto the changed upstream port; or, sending the LLDP message and the extended port message through the changed upstream port; or reconfiguring tag information on the upstream port determined previously onto the changed upstream port, and sending the LLDP message and the extended port message through the changed upstream port.

7. The method according to claim 6, wherein, the step of the PE changing the upstream port determined previously comprises:
the PE changing the upstream port determined previously according to port priority information carried in the received LLDP messages sent by the CB; or changing the upstream port determined previously because the upstream port determined previously breaks down and is unable to work.

8. The method according to claim 1, wherein, the PE determines an upstream port other than a previous upstream port, which comprises:
the PE determining an upstream port other than the previous upstream port according to port priority information carried in the received LLDP messages sent by the CB; or determining an upstream port other than the previous upstream port because the previous upstream port breaks down and is unable to work.

9. A controlling bridge (CB) for acquiring port extension (PE) topology information, comprising:
an establishing device, a sending device, a processor, and a storage device for storing computer executable instructions, wherein,
a perceiving module executed, by the processor, to perceive the CB is connected to the PE after the CB receives a link layer discovery protocol (LLDP) message sent by the PE; and
after the CB receives the Extended Port Create message sent by the PE, the establishing device acquires extended ports of the PE,
instantiates instantiated ports corresponding to the extended ports one by one inside the CB, and
establishes channels from the instantiated ports to the extended ports corresponding to the instantiated ports;
the sending device sends LLDP messages through ports to the PE, wherein the LLDP messages sent by the sending device through the ports to the PE carry cascade port priorities assigned by the CB to the ports respectively,
the PE determines a port in the ports as an upstream port according to the received LLDP messages, and
the PE reconfigures tag information on a previous upstream port onto the determined upstream port, and sends an LLDP message and extended port message through the determined upstream port.

10. The CB according to claim 9, wherein:
the sending device is further configured to: send an LLDP message to the PE through the instantiated ports after instantiating the corresponding instantiated ports inside the CB.

11. The CB according to claim 10, wherein, the perceiving module is further configured to: if the LLDP message received by the CB and sent by the PE is the LLDP message sent by the PE and received by one port of the CB for a first time, then create an internal PE inside the CB, and instantiate an instantiated port on the PE inside the CB, or
wherein, the perceiving module is further executed, by the processor, to create an internal PE inside the CB; or
to instantiate ports on the CB and the internal PE to connect the CB and the PE when the CB receives the LLDP message sent by the PE; or
to create an internal PE inside the CB and instantiate ports on the CB and the internal PE to connect the CB and the PE when the CB receives the LLDP message sent by the PE.

12. A system for acquiring port extension (PE) topology information, comprising the CB according to entire claim 9 and a PE, wherein, the PE comprises a determination device and a sending device, wherein,
the determination device is configured to determine an upstream port according to a received link layer discovery protocol (LLDP) message sent by the CB; and
the sending device is configured to send an LLDP message and Extended Port Create message to the CB according to the upstream port determined by the determination device.

13. The system according to claim 12, wherein, the PE further comprises a processing device, wherein:
the processing device is configured to determine an upstream port other than the previous upstream port, and reconfigure tag information on the previous upstream port onto the determined upstream port; and
the sending device is configured to send the LLDP message and the extended port message through the determined upstream port, preferably,
wherein: the processing device is configured to determine an upstream port other than the previous upstream port by means of: determining an upstream port other than the previous upstream port according to port priority information carried in the received LLDP messages sent by the CB; or determining an upstream port other than the previous upstream port because the previous upstream port breaks down and is unable to work.

14. The system according to claim 12, wherein:
the PE is configured to determine an upstream port other than a previous upstream port by means of: determining an upstream port other than the previous upstream port according to port priority information carried in the received LLDP messages sent by the CB; or determining an upstream port other than the previous upstream port because the previous upstream port breaks down and is unable to work.

\* \* \* \* \*

UNITED STATES PATENT AND TRADEMARK OFFICE
CERTIFICATE OF CORRECTION

PATENT NO. : 9,515,890 B2  
APPLICATION NO. : 14/115724  
DATED : December 6, 2016  
INVENTOR(S) : Ting Ao et al.

Page 1 of 1

It is certified that error appears in the above-identified patent and that said Letters Patent is hereby corrected as shown below:

On the Title Page

Item (54) and in the Specification, Column 1, Line 1 the Title should be corrected as:
Controlling Bridge for Determining An Upstream Port and Establish A Channel with A Port Extender Signed and Sealed this
Sixth Day of June, 2017

Michelle K. Lee
*Director of the United States Patent and Trademark Office*